April 18, 1961   C. R. LARSON   2,980,593
METHOD OF TREATING CHROMIUM PLATED CYLINDERS
Filed May 27, 1958

INVENTOR:
Carl R. Larson
BY
ATTY

United States Patent Office 2,980,593
Patented Apr. 18, 1961

2,980,593
METHOD OF TREATING CHROMIUM PLATED CYLINDERS

Carl R. Larson, Miami Springs, Fla., assignor to Aerodex, Inc., Miami, Fla., a corporation of Delaware Filed May 27, 1958, Ser. No. 738,153

1 Claim. (Cl. 204—26)

The present invention relates to a new and novel method of treating chromium plated engine cylinders, and more particularly to a method wherein the surface of the chromium is treated in such a manner that scoring of the surface is prevented when a piston or the like is operated within the cylinder.

The invention method is adapted for use in the manufacture of bores in cylinders having pistons employing piston rings therein such as employed in airplane engines or the like. Aircraft engines are ordinarily subjected to heavy wear, and in accordance with accepted safety measures, the engines are periodically overhauled. During such overhauling procedures, it is common practice to form a new surface on the bore of the cylinders to compensate for irregularities produced in the cylinder walls due to ordinary wear.

When it is desired to provide a new cylinder bore in airplane engines, it is, of course, possible to install a new cylinder or to rebarrel the old cylinder. This procedure, however, is excessively expensive and accordingly it is not desirable from an economic standpoint. As a result, various methods have been devised in the prior art for manufacturing the new bore in such cylinders. It has been a common practice in the art to provide a chromium surface on the bore by electroplating or similar methods, and the surface of the chromium plating is subsequently reduced to the desired inner diameter as by honing or the like. Such chromium plated bores are highly desirable as the rate of wear of the bore is greatly reduced since the chromium layer is extremely hard and is also highly resistant to corrosion.

Although chromium plated bores are highly desirable, chromium presents serious problems which heretofore have not been successfully solved in the prior art. The rebuilt aircraft engines are generally operated on a test stand for approximately four hours in order to seat the rings to the cylinder and to determine whether or not they are in proper operating condition. During and at the end of the test run, the cylinders are again examined to determine if the cylinders have been scored during the testing operation. If the cylinder has been scored, it is, of course, necessary to reoverhaul the engine and rechrome the cylinders thereby involving considerable additional expense in time and parts.

It has been found that during such trial run operations, the chromium plated cylinders are often scored, and accordingly the expense of reoverhauling the engines has been excessive. The scoring of such chromium cylinders has occurred ordinarily during the first hour or two of operation mainly as a result of improper lubrication between the cylinder wall and the piston rings of the piston slidably operating within the cylinder. It has been a common practice in the prior art to provide conventional oil lubrication between the cylinders and the piston rings, but this type of lubrication is not adequate during the initial rubbing contact between the piston rings and the cylinder walls. If the cylinder wall is not scored within the first two hours of operation, it has been found that the cylinder walls will not be scored during normal operations during several overhaul periods. It is, accordingly, evident that the prevention of scoring during the first few hours of operation of the engine after providing it with a chromium plated bore is critical.

It is important at this point to briefly consider the reason why such chromium plated cylinders have often been scored in accordance with prior art practice. Chromium has certain peculiar characteristics which cause such scoring. Chromium may be termed oleophobic and hydrophobic, or in other words, it exhibits an aversion to oil and water such that when the lubricating oil is initially applied to the chromium plated surface of the cylinder, the oil does not distribute itself evenly and uniformly, but tends to become isolated in separated patches or to ball up. It is this characteristic of chromium which prevents the lubricating oil from being initially properly distributed between the piston rings and the cylinder walls, and as a result, certain portions of the cylinder wall, even though porous, are not protected by lubricating film, thereby causing the cylinder wall and the piston rings to come into metal-to-metal contact and, accordingly, scoring the walls of the cylinder, the pistons and rings. According to the present invention, a chromium surface is provided wherein a lubricating coating is initially provided thereon such that the layer of chromium will be protected from coming into surface-to-surface frictional contact with the piston rings thereby preventing scoring during initial operation of the engine. After two or three hours of operation, it has been found that the surface of the cylinder will have become sufficiently conditioned that thereafter normal engine lubrication is adequate to prevent scoring for the service life of the chrome plated cylinder wall.

According to the present invention, a chromium layer is first deposited electrolytically on the cylinder bore such that the inner diameter of the cylinder is slightly less than the desired finished diameter thereof. It is desirable that the surface of the chromium be provided with numerous small etchings, grooves or depressions which assume the configuration of an interlaced network between plateaus, each of such grooves being adapted to retain a lubricating material therein thereby providing a means whereby the lubricant will tend to remain in certain localized areas of the chromium surface. The formation of such fine etched-out lines or depressions is sometimes referred to as "crazing." Such depressions may be formed, for example, in a manner known in the art, wherein the layer of chromium is first deposited electrolytically on the cylinder bore employing an aqueous chromic acid bath or solution and an anode. The current is then reversed for a short time such that the bore becomes the anode and a certain amount of the chromium is removed from the surface. This treatment provides a chromium surface which is covered with small interconnecting grooves which have the appearance of cracks in the surface. Specifications for such treatment are set forth in USAF specifications MIL-C-7460 of February 7, 1952.

The inner diameter of the cylinder is then reduced to the desired diameter as by honing or the like. After cleaning the bore, a heat dissipator is preferably attached to the external surface of the cylinder, although the heat dissipator may be attached at any time prior to performing the heating operation of the invention method.

A dry lubricant of colloidal size which is preferably carbonaceous such as graphite or the like, is then applied to the surface of the chromium layer. The excess of the lubricant is then wiped off and an adhesive carbonizable substance which has an affinity for the dry lubricant is then applied to the chromium surface. The excess of the substance is then wiped off.

Heat is then applied to the adhesive substance at a temperature sufficient to at least partially carbonize the substance, and small protuberances are formed which project outwardly from the surface of the chromium layer. These protuberances are subsequently removed in a suitable manner. The bore of the cylinder is then in finished condition and is adapted to receive an associated piston therein for normal engine operation.

An object of the present invention is to provide a new and novel method of treating chromium plated cylinders whereby scoring of the cylinder is reduced to a minimum.

Another object of the present invention is to provide a new and novel method of treating cylinder bores which can be quickly and easily performed with a minimum of skill and effort.

A further object of the present invention is the provision of a method of treating chromium plated cylinders which does not require any specialized and complex equipment in order to carry out the steps of the method.

Yet another object of the present invention is to provide a method of treating chromium plated cylinders which employs relatively inexpensive materials thereby reducing the cost to a minimum, and yet which provides reliable and consistent results.

Other objects and many of the attendant advantages of the present invention will become more apparent when considered in connection with the accompanying specification and drawings wherein.

Figure 1:
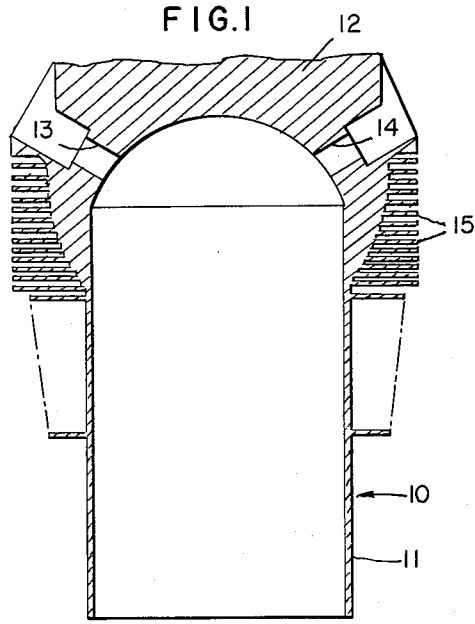
Fig. 1 is a longitudinal cross-sectional view of a cylinder adapted to be treated by the invention method.

Referring now to the drawings wherein like reference characters designate corresponding parts throughout the several views, there is shown in Fig. 1 a conventional aircraft cylinder indicated generally by the reference numeral 10 including a cylinder wall 11 having a cylinder head 12 at the upper end thereof. The cylinder head is provided with conventional openings 13 and 14 for receiving spark plugs. The cylinder head is also provided with conventional radially extending fins 15 which serve to cool the cylinder head during operation.

Figure 2:
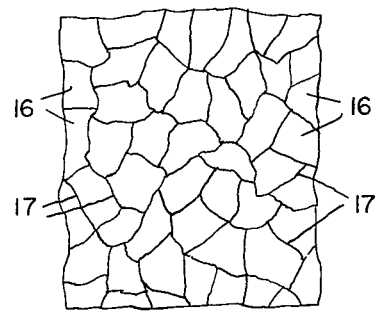
Fig. 2 is an enlarged view illustrating the manner in which the network of grooves is formed in the chromium surface.

The bore of the cylinder is initially provided with a layer of chromium by depositing the chromium electrolytically as previously mentioned, and the current is then reversed for a short time such that the bore becomes the anode and small grooves are formed in the surface of the chromium. Referring to Fig. 2, the manner in which the interconnecting network of grooves is formed is shown in a highly magnified illustration. A number of relatively short intersecting etchings, grooves or depressions 17 extending around plateaus 16 are provided such that a dry lubricant can be retained in localized areas of the chromium by such grooves. It is apparent that a continuous interconnection is provided between each of the grooves in the surface of the chromium.

Subsequent to plating the bore such that the inner diameter thereof is slightly less than the desired finished diameter, the walls of the bore are then reduced to the desired finished diameter as, for example, by honing with grit stones or the like.

Figure 4:
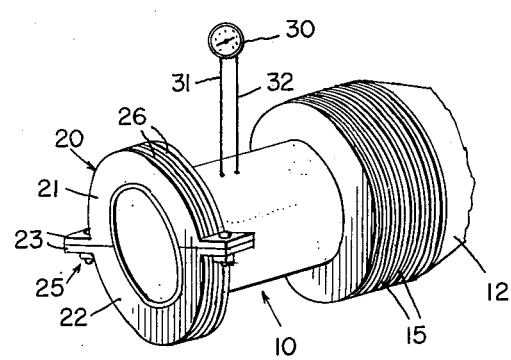
Fig. 4 illustrates the heat dissipator means mounted in operative position on a cylinder with a heat measuring means also connected to the cylinder.
Figure 3:
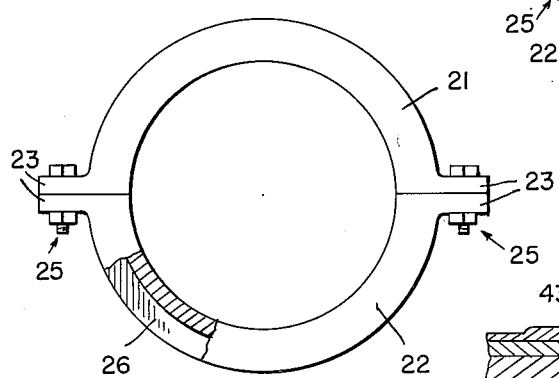
Fig. 3 is an elevation of a heat dissipator means adapted to be clamped about the cylinder.

The cylinder is then preferably turned on its side as seen in Fig. 4 and a heat dissipator means indicated generally by reference numeral 20 is attached to the lower end of the cylinder. Referring to Fig. 3, the heat dissipator comprises two substantially semicylindrical portions 21 and 22, each of which is provided with laterally extending flanges 23 at diametrically opposite portions thereof. The flanges 23 of members 21 and 22 are disposed in abutting relationship and a nut and bolt assembled indicated generally by reference numeral 25 is threaded through suitable aligned openings in the flanges for connecting the two halves of the heat dissipating means in operative position. The heat dissipator is preferably formed of a good heat conducting medium such as cast iron, and is provided with a plurality of radially and annularly extending ribs 26 which serve to increase the surface of the member to provide more efficient heat dissipation. Fig. 4 illustrates the heat dissipator mounted in clamped operative position on the cylinder, and the outer diameter of the heat dissipator and the cylinder head are preferably substantially equal such that the axis of the cylinder is disposed approximately parallel to the surface upon which the cylinder rests. A thermometer 30 has leads 31 and 32 connected in a suitable manner to the exterior surface of the cylinder such that the temperature of the cylinder can be accurately checked during the heating step of the invention method.

Figure 5:
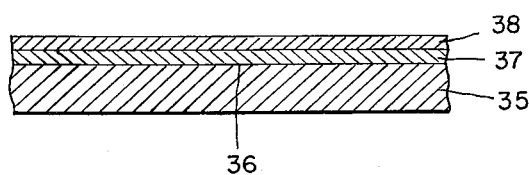
Fig. 5 illustrates schematically the manner in which the cylinder bore is built up.

With the cylinder in the position as shown in Fig. 4, a dry lubricant is applied to the surface of the chromium by any suitable means such as by employing a swab or by hand if desired. The dry lubricant employed according to the present method is preferably carbonaceous, and graphite or molybdenum disulfide are two examples of a suitable dry lubricant. The dry lubricant is of colloidal size, and preferably of a high carbon content. After applying the dry lubricant, the excess thereof is wiped off thereby leaving a thin layer of dry lubricant on the upper surface of the chromium layer. As seen in Fig. 5, the chromium layer is indicated by reference numeral 35 and the upper surface 36 thereof is initially provided with a thin layer of dry lubricant 37.

A suitable adhesive substance which has an affinity for or will stick to the dry lubricant is then smeared upon the surface of the bore. The sticky substance employed as an adhesive is at least partially carbonizable, and preferably is a substance which is substantially entirely carbonizable. For example, dark syrup identified by the trademark "Karo" has been found particularly suitable for this purpose. Such syrup contains a high percentage of sucrose which, of course, is readily carbonizable within a temperature range of 400° to 500° F. After application of the adhesive substance, the excess thereof is then wiped off such that the sticky substance is then disposed in a thin layer over the chromium surface as is shown schematically by reference numeral 38 in Fig. 5 of the drawing.

The adhesive substance and surface of the bore are then heated in a suitable manner such that the adhesive substance is caused to carbonize. The heat is preferably applied as by a hand gas torch employing a flame. The adhesive substance is raised to its incandescent temperature. The flame commonly provided by hand torches may be at a temperature of approximately 1000° C., and accordingly the flame is preferably moved slowly about the surface of the bore such that no one portion of the bore becomes overheated. As a practical matter, temperatures in excess of 600° F. will cause permanent damage to parts of the cylinder, and accordingly the method of heating should be such as to maintain the temperature of the cylinder considerably under 600° F. in order to eliminate the possibility of damaging the cylinder. In practice, a temperature of between 450° to 500° F. is quite practical. This burning operation ordinarily requires approximately 7 to 10 minutes to properly carbonize the adhesive material. Heat dissipator means 20 tends to prevent the cylinder skirt from becoming overheated, and the temperature of the wall may be constantly checked by observing the thermometer 30 which is connected to the wall of the cylinder.

Figure 6:
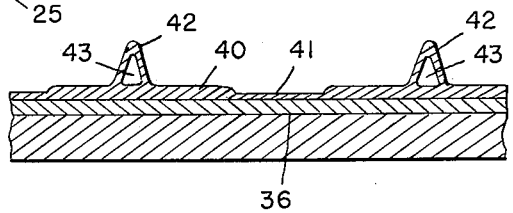
Fig. 6 illustrates the manner in which protuberances are developed as a result of the heating operation.

As the heat is applied to the surface of the bore and the adhesive substance is carbonized, localized areas of the adhesive coating will appear to contract as seen in Fig. 6 forming raised islands 40 which are spaced a greater distance from the upper surface 36 of the chromium than the remaining portions 41 of the adhesive coating. At approximately the center of each of the somewhat irregular shaped islands 40 small protuberances or blisters 42 having a cavity 43 therein are formed which project outwardly from the bore surface a considerable distance. These protuberances 42 are raised to incandescent temperature during the heating operation, and will glow during the application of heat to the adhesive substance. It is believed that the surface area of protuberances 42 which project a considerable distance outwardly from the bore surface serves to dissipate a considerable portion of the heat applied to the surface, thereby materially assisting in preventing the cylinder walls from becoming overheated during application of heat thereto.

After application of heat to the adhesive substance, substantially all the stickiness of the adhesive substance is removed, and protuberances 42 project outwardly from the bore surface. The protuberances are then removed to provide a substantially smooth inner surface on the bore. The protuberances may be removed in a suitable manner, and it is preferred to remove them by briskly brushing them with a brush having relatively stiff bristles for this purpose. When the protuberances 42 have been removed, and the stickiness is gone from the adhesive substance, the surface of the bore is finished and is provided with a hard dark stained coating. The cylinder is then in condition for receiving a piston therein and to be operated under normal conditions. In practice, it has been found that cylinder bores treated in the manner according to the present invention provide vastly improved results over those obtained previously, and scoring of the cylinder bores has been substantially reduced.

It is apparent from the foregoing that there is provided a new and novel method of treating chromium plated cylinders wherein scoring of the cylinders during operation is reduced to a minimum. The method can be performed quickly and easily and requires a minimum amount of effort and skill on the part of an operator. Care must be exercised particularly in applying the adhesive substance such that undesired portions of the cylinder are not impinged upon by the adhesive substance, and the temperature of the cylinder walls must be maintained below the critical limit, but such precautions can easily be taken by even the most inexperienced operator. It is evident that very simple conventional equipment is employed in carrying out the process, and the materials used are very inexpensive and easily obtainable. The cost of the process has, accordingly, been reduced to a minimum, and yet very reliable and consistent results are obtained with the invention method.

As this invention may be embodied in several forms without departing from the spirit or essential characteristics thereof, the present embodiment is therefore illustrative and not restrictive, and since the scope of the invention is defined by the appended claim, all changes that fall within the metes and bounds of the claim or that form their functional as well as conjointly cooperative equivalents are therefore intended to be embraced by the claim.

I claim:

In the treatment of cylinders of engines of the piston type for elimination of scoring of the wall by piston rings during the initial operation of the piston in the cylinder bore, a method which comprises electrolytically depositing a chromium layer on the wall of the cylinder in such quantities that the thickness thereof is slightly less than the desired finished diameter of the cylinder bore and producing in the deposited chromium a plurality of interconnecting grooves to retain lubricating material therein, reducing the chromium surface to the desired diameter, applying a dry lubricant of colloidal size to the surface of the chromium, removing the excess lubricant, applying on the dry lubricant an adhesive carbonizable substance having an affinity therefor, removing the excess adhesive carbonizable substance, heating the applied adhesive at a temperature sufficient to at least partially carbonize the adhesive substance thereby producing raised irregularly shaped spaced areas which areas are spaced a greater distance from the chromium surface than the remainder of the carbonized areas, and simultaneously producing small hollow protuberances on the irregularly shaped areas, removing the protuberances and finishing the interior of the adhesive coated bore to a smooth condition whereupon the cylinder is ready for reception therein of the piston.

References Cited in the file of this patent

UNITED STATES PATENTS

| | | |
|---|---|---|
| 482,176 | Holmes | Sept. 6, 1892 |
| 1,168,050 | Benbow | Jan. 11, 1916 |
| 1,185,682 | Kirkegaard | June 6, 1916 |
| 1,466,432 | Gerleman | Aug. 28, 1923 |
| 1,481,936 | Thomson | Jan. 29, 1924 |
| 2,225,815 | Acheson | Dec. 24, 1940 |
| 2,412,698 | Van de Horst | Dec. 17, 1946 |

FOREIGN PATENTS

| | | |
|---|---|---|
| 384,280 | Great Britain | 1932 |
| 707,066 | Great Britain | Apr. 14, 1954 |